Aug. 15, 1967
C. GOODMAN
3,335,613
FORCE MEASURING SYSTEMS USING RESONANT ABSORPTION
Filed Jan. 25, 1961
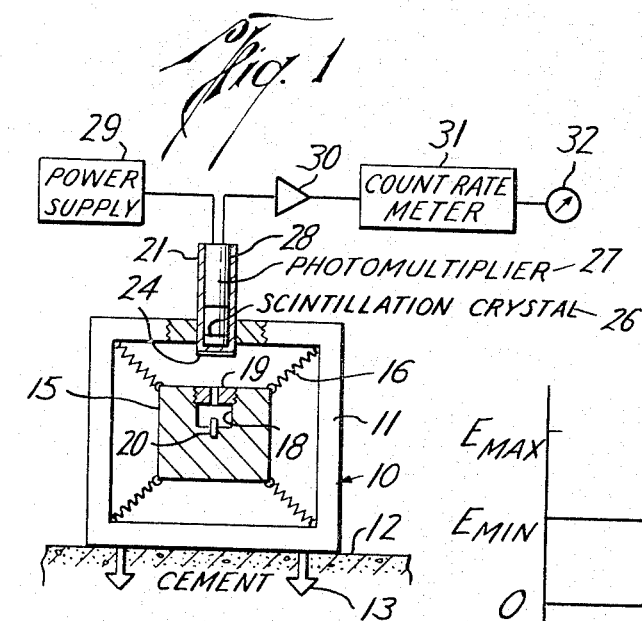
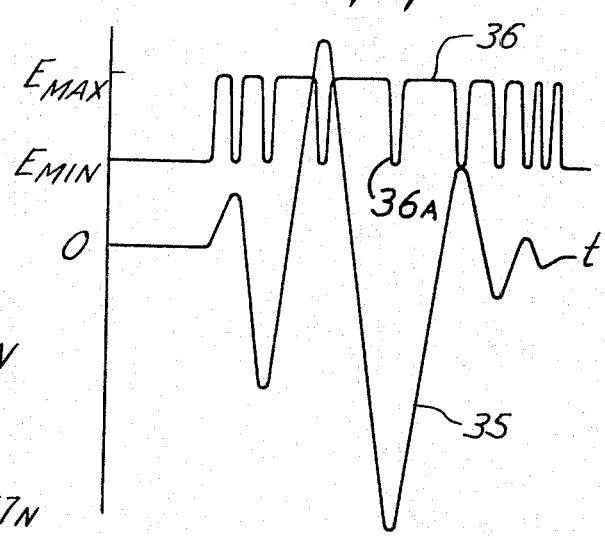
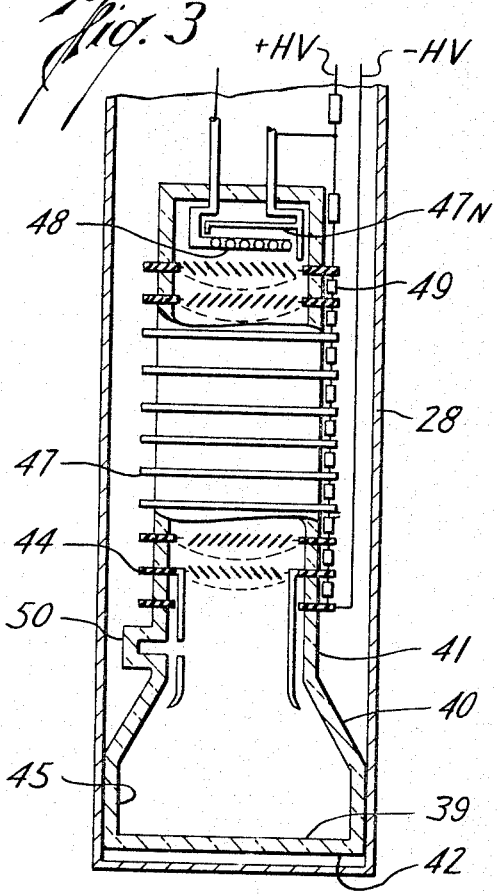
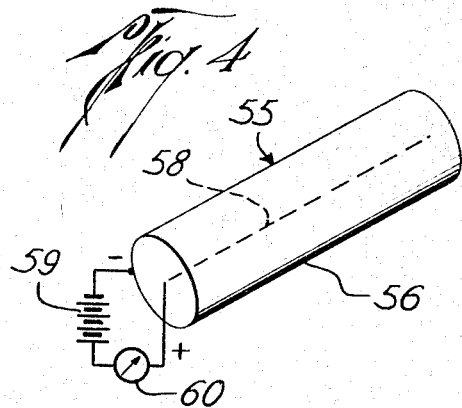
Clark Goodman
INVENTOR.
BY [signature]
ATTORNEY

United States Patent Office 3,335,613
Patented Aug. 15, 1967

3,335,613
FORCE MEASURING SYSTEMS USING RESONANT ABSORPTION
Clark Goodman, Houston, Tex., assignor to Schlumberger Limited, Houston, Tex., a corporation of Netherlands Antilles
Filed Jan. 25, 1961, Ser. No. 84,890
12 Claims. (Cl. 73—517)

This invention relates to measuring systems which are responsive to relative displacements and, more particularly, to measuring apparatus such as seismometers or the like requiring a high degree of sensitivity to relative displacements.

As reported by R. L. Mössbauer in Zeit. f. physik 151, 124–143 (1958); Naturwiss. 45, 538 (1958); Zeit. Naturforsch 14a, 211 (1959) and in publications by subsequent workers, it is possible to detect a Doppler shift in the frequency of low energy gamma rays emitted by a radioactive isotope, using a gamma ray absorbing isotope exhibiting a resonance absorption within the range of the shifted frequency. By minimizing the recoil energies of the emitting and absorbing nuclei, such resonance may exhibit a very narrow line width, for example, one part in $10^{12}$, thereby obtaining high sensitivity to a correspondingly slight Doppler shift. By way of illustration, radioactive cobalt-57 having a convenient half-life of 270 days decays into excited nuclei of iron-57 which in turn emit 120 and 14.4 kev. gammas in cascade. The emission of the 14.4 kev. gamma ray has a half-life of $10^{-7}$ seconds. Using a metallic foil enriched in the iron-57 isotope (abundance of 2.17 percent in ordinary iron) as an absorber in close proximity to the cobalt-57 source, a narrow and very substantial resonance absorption is obtained even at room temperatures. The original work of R. L. Mössbauer was applied to iridium-191 utilizing its 129 kev. gamma rays at a temperature near 88° K. Subsequently, the name "Mössbauer effect" has been given to other systems of gamma ray emitting and absorbing isotopes exhibiting narrow resonances. Isotopes suitable for demonstrating the Mössbauer effect are given in Table I.

TABLE I—PARENTS OF MOSSBAUER NUCLEI

| Stable Nucleus | β⁻ Parent | | β⁺ Parent | |
|---|---|---|---|---|
| | Nucleus | $T_{1/2}$ | Nucleus | $T_{1/2}$ |
| $Fe^{57}$ | $Mn^{57}$ | 1.7m | $Co^{57}$ | 270d |
| $Zn^{67}$ | $Cu^{67}$ | 59h | $Ga^{67}$ | 80h |
| $Pd^{105}$ | $Rh^{105}$ | 37h | $Ag^{105}$ | 40d |
| $Ag^{107}$ | | | $Cd^{107}$ | 7h |
| $Ag^{109}$ | $Pd^{109}$ | 14h | | |
| $Sn^{119}$ | $In^{119}$ | 17.5m | $Sb^{119}$ | 39h |
| $I^{127}$ | $Te^{127}$ | 9.4h | $Xe^{127}$ | 36.4d |
| $Xe^{131}$ | $I^{131}$ | 8.08d | | |
| $Cs^{133}$ | $Xe^{133}$ | 5.27d | $Ba^{133}$ | 7.2y |
| $Nd^{145}$ | $Pr^{145}$ | 5.9h | $Pm^{145}$ | 18y |
| $Sm^{152}$ | | | $Eu^{152}$ | 9.2h |
| $Eu^{151}$ | $Sm^{151}$ | 93y | $Gd^{151}$ | 150d |
| $Eu^{153}$ | $Sm^{153}$ | 47.1h | $Gd^{153}$ | 236d |
| $Gd^{154}$ | $Eu^{154}$ | 16y | $Tb^{154}$ | 8h |
| $Gd^{155}$ | $Eu^{155}$ | 1.7y | $Tb^{155}$ | 5.6d |
| $Gd^{156}$ | $Eu^{156}$ | 15.4d | $Tb^{156}$ | 5.6d |
| $Dy^{160}$ | $Tb^{160}$ | 72.3d | $Ho^{160}$ | 28m |
| $Dy^{161}$ | $Tb^{161}$ | 6.88d | $Ho^{161}$ | 2.5h |
| $Ho^{165}$ | $Dy^{165}$ | 139.2m | | |
| $Er^{166}$ | $Ho^{166}$ | 27.3h | $Tm^{166}$ | 7.7h |
| $Er^{168}$ | | | $Tm^{168}$ | 85d |
| $Tm^{169}$ | $Er^{169}$ | 9.4d | $Yb^{169}$ | 31.8d |
| $Yb^{170}$ | $Tm^{170}$ | 129d | $Lu^{170}$ | 1.7d |
| $Yb^{171}$ | $Tm^{171}$ | 680d | $Lu^{171}$ | 600d |
| $Yb^{172}$ | $Tm^{172}$ | 63.6h | $Lu^{172}$ | 4.0h |
| $Yb^{173}$ | | | $Lu^{173}$ | 1.41y |
| $Yb^{174}$ | | | $Lu^{174}$ | 165d |
| $Lu^{175}$ | $Yb^{175}$ | 101h | $Hf^{175}$ | 70d |
| $Hf^{176}$ | $Lu^{176m}$ | 3.71h | $Ta^{176}$ | 8.0h |
| $Hf^{177}$ | $Lu^{177}$ | 6.75d | $Ta^{177}$ | 53h |
| $Hf^{178}$ | | | $Ta^{178}$ | 2.1h |
| $Hf^{180}$ | | | $Ta^{180}$ | 8.15h |
| $Ta^{181}$ | $Hf^{181}$ | 44.6d | $W^{181}$ | 145d |
| $W^{182}$ | $Ta^{182}$ | 115.1d | $Re^{182}$ | 64.0h |
| $W^{184}$ | $Ta^{184}$ | 8.7h | $Re^{184}$ | 50d |
| $Re^{187}$ | $W^{187}$ | 24.0h | | |
| $Ir^{191}$ | $Os^{191}$ | 16.0d | $Pt^{191}$ | 3.00d |
| $Ir^{193}$ | $Os^{193}$ | 30.6h | | |
| $Pt^{195}$ | | | $Au^{195}$ | 180d |
| $Au^{197}$ | $Pt^{197}$ | 18h | $Hg^{197}$ | 65h |
| $Hg^{199}$ | $Au^{199}$ | 3.14d | $Tl^{199}$ | 7.4h |
| $Hg^{201}$ | | | $Tl^{201}$ | 72h |
| $Th^{232}$ | $U^{236}$* | 2.4(7)y | $Pa^{232}$ | 1.31d |
| $U^{235}$ | $Pu^{239}$* | 2.4(4)y | | |
| $U^{238}$ | $Pu^{242}$* | 3.8(5)y | | |
| $Am^{241}$ | $Bk^{245}$* | 4.98d | | |

*α emitter.

In a typical demonstration of the Mössbauer effect, either the source or the absorber remains stationary, and the other is moved, for example, by an audio loudspeaker cone, an engine lathe or a record turntable. To obtain a measure of the absorption characterizing the effect, a scintillation counter is typically spaced from the face of the absorber film opposite from the source so as to be responsive to the transmitted (i.e., non-absorbed) gamma rays passing from the source through the absorber film.

In addition to a standard scintillation counter arranged in this manner, a similar counter oriented transversely with respect to the direct transmission path is sometimes employed to detect gamma rays scattered by the absorber at right angles from the collimated beam emitted by the source. At resonance, the measured intensity of transmitted gamma rays may be reduced by fifty percent or more and the scattered gamma rays correspondingly increased; hence, the respective counters give opposite indications to substantiate occurrence of the Mössbauer effect. For a further, somewhat simplified discussion of the effect, reference may be had to an article, "The Mössbauer Effect," by S. de Benedetti in the Scientific American, April 1960, at pages 73–80.

It is an object of the present invention to provide new and improved measuring systems rendered more sensitive by a utilization of the Mössbauer effect.

Another object of the invention is to provide such systems which are primarily responsive to the presence or absence of relative velocity for obtaining indications of force, wave motion or energy levels tending to produce time varying relative displacements.

Another object of the invention is to provide such systems for obtaining indications of the time of occurrence of the peak or maximum excursion of a transient or oscillatory phenomenon or its initial departure from a quiescent condition.

A further object of the invention is to provide new and improved detecting apparatus for such systems characterized by high efficiency and compactness.

These and other objects are obtained, in accordance with the invention, by mounting a source and absorber susceptible of exhibiting the Mössbauer effect on respective bodies and applying to at least one of said bodies an input signal representing a time-varying force, impulse, or energy to be measured, while simultaneously obtaining indications representative of the degree of resonance absorption in said absorber of the gamma rays emitted with a substantially constant intensity by the source.

In one embodiment, the source is secured to the suspended mass of a seismometer and the absorber is secured to the frame opposite the source, together with the absorption detector, which may be a standard scintillation crystal and photomultiplier.

In a modification, the absorber comprises the photocathode of a photomultiplier or like photoemission-sensitive device, eliminating the necessity for a scintillator with a consequent increase in detection efficiency.

In another modification the absorber comprises the conductive cathode of a proportional counter which counts the electrons emitted by the internally converted gamma rays absorbed by the cathode.

The invention, together with others of its objects and advantages, will be better understood from the following detailed description taken in conjunction with the drawing, in which:

FIG. 1 is a schematic illustration of a seismometer constructed in accordance with the invention;

FIG. 2 is a graphical representation of a seismic wave front indicating comparatively the output of a standard seismometer and of a seismometer in accordance with the present invention;

FIG. 3 is a schematic illustration of a gamma ray detector having a photocathode for resonant absorption of incident gamma rays; and FIG. 4 is a schematic illustration of a proportional counter having an absorbing cathode for resonant absorption of incident gamma rays.

As shown in FIG. 1, the principles of the invention are exemplified by a seismometer 10 having a frame 11 securely anchored to the earth or other body 12 in which a seismic wave is to be detected. While the frame is thus designed to participate directly in the oscillations characterizing the seismic wave by the tight coupling effected, for example, by anchors 13, there is loosely coupled to the frame an inertial mass 15 designed to resist participation in the seismic movement. Hence, the input seismic signal characteristically develops a time-varying relative displacement between the frame 11 and inertial mass 15, this relative displacement being accommodated by a spring or like suspension arrangement 16 providing the loose coupling between the mass and frame. While the seismic signal may typically have components acting in transverse horizontal directions (shear) as well as vertically (compression), the invention is conveniently illustrated by detection of the vertical component of the seismic signal.

To this end, the inertial mass 15 is provided with a cavity 18 closed by annular plug 19 the bore of which defines a collimating aperture opening vertically at the upper surface of the mass. Securely affixed within the cavity 18 is a radioactive source 20 of low energy gamma radiation suitable for exhibiting the Mössbauer effect. The source 20 may be positioned opposite the bore of plug 19 to direct a beam of collimated gamma rays vertically toward the detecting apparatus 21 suitable for detecting gamma absorption in accordance with the Mössbauer effect. Hence, the inertial mass 15 including plug 19, when composed of a suitable material substantially opaque to low energy gamma radiation serves as well to shield and collimate gamma radiation from the source 20 affixed therein.

The detecting apparatus 21 secured to frame 11 vertically above the apertured plug 19 comprises an absorber 24 supported dependently in directly confronting relation to the collimated source and means such as a standard photomultiplier and scintillation crystal for detecting the intensity of gamma radiation transmitted through the absorber. Because the photomultiplier is, of course, light sensitive it may be shielded by an opaque container 28 which may for reasons hereafter explained be composed of beryllium, or preferably aluminum. In a conventional manner, photomultiplier 27 may be energized by a power supply 29, and the output pulses from this photomultiplier may be supplied via amplifier 30 to a count rate meter 31 coupled to a suitable indicator 32 such as a recorder providing a permanent record of meter output as a function of time. If desired, the seismometer 10 may also have the standard inductive pickup or mechanical leverage arrangement for deriving conventional seismic records.

In order that the detecting apparatus 21 may provide indications of the input seismic signal in accordance with the Mössbauer effect, the source 20 and absorber 24 must not only contain suitable emitting and absorbing isotopes but also the nuclei of such isotopes participating in the resonant emission and absorption must be characterized by relatively small recoil energy. Considering by analogy the energy spread of bullets fired from a gun free to recoil in varying degrees, it will be evident that recoil of a nucleus upon decay from an isomeric state will affect the energy of any gamma ray emitted as a decay product. It may be helpful here to recall that the energy E of the gamma photon corresponds with a definite frequency $\nu$ in accordance with the well-known expression:

$E=h\nu$, where $h$ is Planck's constant. In perhaps more familiar terms, then, a variation in energy attributable to recoil gives rise to a corresponding change in frequency which may be sufficient to depart from a condition of resonance. As explained in the previously cited articles, R. L. Mössbauer has demonstrated that recoil of gamma emitting nuclei can be reduced by incorporating such nuclei in a suitable crystalline structure such that the inner atomic forces within the crystalline structure provide sufficiently close coupling with the nuclei to retard or resist recoil and thus to reduce the energy of recoil. By analogy, again, this would correspond with firmly securing the gun to the earth or other large mass. In this manner, the emitted gamma rays are substantially monoenergetic to an extent required for an observation of the Mössbauer effect.

Isotopes having suitable nuclei are numerous as indicated heretofore. Moreover, suitability of various isotopes can readily be determined by such criteria as their emission of low energy gamma rays, preferably only of one energy in substantial abundance, having a small recoil energy and suitable for incorporation in a crystalline solid having a Debye temperature which is relatively high in comparison with room temperature as measured on the Kelvin or absolute temperature scale. Whereas many isotopes require extremely low or cryogenic temperatures for efficient exhibition of the Mössbauer effect, a particularly suitable isotopes for the present invention is iron-57, together with its isomer cobalt-57. As described by J. G. Dash et al. in the Physical Review Letters, vol. 5, page 152 (1960), a suitable source may comprise 10 millicuries of the isotope cobalt-57 in natural iron prepared by plating followed by thermal diffusion. The cobalt-57 has a half-life of 270 days characterizing its isomeric decay to iron-57 coupled with emission of gamma radiation of 14.4 kev., the half-life for the excited state of the iron-57 nucleus being approximately $10^{-7}$ second. In general then, the source is in the form of a thin metallic foil or layer having a crystalline structure which reduces the recoil energy of the emitting nuclei below that which they exhibit, for example, in a pure state or in the absence of lattice binding forces.

Corresponding properties are suitable for the resonant absorber. For example, a two milligram per centimeter squared film of iron-57 plated on a 0.1 mil nickel foil is suitable for use with the previously described cobalt-57 source. Alternatively for a source comprising 20 millicuries of cobalt-57 in a matrix of iron-56, a resonant absorber comprising an iron-57 foil (65% iron-57 electroplated on copper) has been found satisfactory. Absorbers have also been prepared by cold rolling as thin foils.

In a typical operation of the aparatus of FIG. 1, the source 20 is placed in the cavity 18 of inertial mass 15 to direct a beam of gamma radiation toward the exposed face of the thin resonant absorber 24. In the rest or static position of the mass 15 with respect to frame 11, the 14.4 kev. gammas emitted by source 20 are highly subject to resonant absorption by the absorber 24, perhaps to the extent of 50% or more. Substantially all of the remaining gamma radiation in the beam is transmitted by the absorber 24 to the scintillation crystal, resulting in optical photons which are converted by the photocathode of photomultiplier 27 to eject secondary electrons, which by cascading of secondary emission in the successive dynodes, results in delivery of an output pulse via amplifier 30 to counting rate meter 31. Depending, then, on the detecting efficiency of the scintillation counter, the indicator 32 will indicate a minimum value corresponding to the intensity of 14.4 kev. gammas transmitted by the film under conditions of peak resonance absorption.

However, it is known that 120 kev. gammas are emitted by cobalt-57 in cascade with the 14.4 kev. gammas and, as such, constitute a "noise" in the presence of which the 14.4 kev. gamma signal must be observed. To minimize the background counting rate attributable to 120 kev. gammas, the scintillator (for example, NaI) is just thick enough to absorb 90 to 95% of the 14.4 kev. gammas but thin enough to absorb only a small fraction of the 120 kev. gammas, absorption being in inverse relation to energy. A typical thickness for this purpose may be 1 to 10 mils, as compared with the diameter of say 1 to 3 cm. At the same time, there may be present K X-rays of iron (6.5 kev.) and these may effectively be excluded by the thin aluminum end plate of container 21 interposed between absorber 24 and the scintillator 26. A higher degree of transparency to the 14.4 kev. gammas may be obtained, however, using a beryllium container 21 but without the advantage of eliminating background counts due to the iron K X-rays, for example.

When a seismic signal is coupled to the frame 11 from the earth, a relative displacement between the frame and inertial mass 15 is obtained indicated in FIG. 2 by curve 35 representing a conventional seismometer record. When the relative velocity of source 20 and detecting apparatus 21 is zero, the indicator 32 reads at a minimum ($E_{min}$). Upon displacement of the frame 11 with respect to the mass 15, a substantial relative velocity is established between the source 20 and detecting apparatus 21. The relative velocity characterized by the slope of the curve 35 may be sufficient to substantially destroy the Mössbauer effect, whereupon absorption of the 14.4 kev. gammas drops substantially and the transmission detected by the scintillation counter increases to a maximum value ($E_{max}$). Depending upon the sharpness of the resonance condition and the sensitivity to relative velocity of source and detector, the resulting indications or recorded curve 36 obtained with the indicator 32 is characterized by a rapid shift at T=0 from $E_{min}$ to $E_{max}$ and thereafter during the occurrence of the seismic signal, by periodic, pulse-like shifts back to the value $E_{min}$ at times corresponding to the maxima and minima of the seismic signal represented by curve 35. It is evident, therefore, that the seismographic signal obtained as a result of the Mössbauer effect provides a sharp indication of the initial arrival of the seismic signal and is susceptible to ready determination of the seismic signal frequency and number of oscillations merely by measuring the time displacement and number of pulses 36a in the recorded curve 36. Thus, in addition to providing a highly accurate indication of the wave front or leading edge of the seismic signal, the signal obtained is readily susceptible to data processing, particularly by digital computers. The ordinary techniques employed with pulse position modulation (PPM) and pulse number modulation (PNM) may be utilized.

It will be evident that the absorber and detector may comprise part or all of the suspended mass of a seismometer and the source may then be secured either to the frame or to the earth proximate to where the frame rests or is attached, the apparatus being otherwise as described in connection with FIG. 1.

While useful results may be obtained with the conventional scintillation counter 26, 27 employed in detecting apparatus 21, it is contemplated in accordance with the present invention that greater sensitivity to relative motion may be obtained using the absorption type gamma ray detector of FIG. 3. Except for a novel photocathode 39, the photomultiplier 40 utilized in the detector of FIG. 3 may be of any suitable design. For example, the highly stable, low noise photomultiplier described in A. Lallemand Patent No. 2,866,914 may be employed. Illustrated in FIG. 3 is a photomultiplier of that type and reference may be had to the Lallemand patent for further details.

Basically, however, the photomultiplier 40 utilizes a glass or ceramic envelope 41 having a flat end window 42 which may be pressed against the interior end face of container 28. Deposited on the interior end of the envelope 41 and electrically connected with an annular cathode contact 44 is a conductive metallic coating 45 composed, for example, of silver. This coating provides a connection between a negative high voltage terminal and the photocathode 39. Spaced above the cathode contact are successive dynodes 47 which may be of the Venetian blind type incorporating focusing wire meshes, the last dynode 47n being in the form of an end wall of a box containing anode 48 from which signals are derived. Voltage dividing resistors 49 connect the dynodes with one another and with the positive and negative terminals of the high voltage supply for application of suitable potentials along the length of the tube.

The photocathode 39, which is semitransparent to 14.4 kev. gammas for example, may be formed on coating 45 opposite the end window 42 by deposition in accordance with the teachings of co-pending application Ser. No. 599,207 filed July 20, 1956 by A. Lallemand and J. P. Causse. For this purpose, suitable evaporators (not shown) are introduced through the side of the envelope 41 prior to formation of the exhaust seal-off 50. However, for formation of the specific photocathode 39, it is necessary to deposit the desired isotope in the required crystalline metallic film. For example, if the isotope is to be iron-57, as is preferred, an initial deposition of a thin beryllium-copper film may be followed by deposition of the iron-57 thereon, whereupon by heating, diffusion may be induced to obtain the desired crystalline structure.

Overall operation of the embodiment of FIG. 1 modified to incorporate the detecting apparatus of FIG. 3 will be evident from the preceding discussion. With particular reference to the improved photocathode, however, the 14.4 kev. gammas directed in a beam from source 20 are incident upon the end face of container 28 and are transmitted through such end face and the end face 42 of the envelope through the conductive substrate provided by coating 45, without substantial attenuation, so as to impinge upon the improved photocathode 39.

Assuming an absence of relative motion between source 20 and the photocathode 39, a substantial percentage of the impinging gammas will be subject to resonant absorption, for example, between 20 and 50%. It is characteristic of the absorption process that electrons are emitted by the iron-57 as a consequence of the internal conversion of the 14.4 kev. gammas. Accordingly, in contradistinction to the standard scintillation counter which has the minimum response for zero relative velocity, the modified photomultiplier 40 has a maximum response due to the maximum absorption which results in cascaded multiplication of the electrons emitted from the photocathode 39. By virtue of the accelerating potential between the photocathode and the first dynode, a high collection efficiency may be obtained. Of course, when a relative velocity produces a Doppler shift in the frequency of impinging gammas, producing a resultant shift away from resonant absorption, lesser numbers of electrons are emitted from the photocathode and a correspondingly smaller indication is obtained on indicator 32.

One particular advantage of the detecting apparatus described in connection with FIG. 3 is that the output of the photomultiplier is relatively free from background counts attributable to transmitted 14.4 kev. gammas, and this is even more true of the 120 kev. cascade gammas. This results from the fact that, apart from resonant absorption, the iron-57 photocathode is relatively insensitive to low energy gammas and consequently emits no corresponding electrons. In the absence, then, of resonant absorption, the indicator 32 will show substantially zero counts from the photomultiplier 40 and, intermediate that condition and a condition of substantially maximum resonant absorption, will indicate intermediate values.

Of course, the thin film of iron-57 or like absorber is protected from contamination or oxidation by containment within the evacuated envelope 41. Furthermore, the photomultiplier 40 can be shorter and more conveniently mounted and handled than the conventional detector 21, without impairing its sensitivity to the Mossbauer effect.

If desired, variations of the detecting apparatus of FIG. 3 may be employed, utilizing the emission of electrons with resonant absorption of gamma radiation to obtain an indication of the intensity of absorption. For example, the absorber may serve as the photocathode of a Geiger or proportional counter or of a photocell. For example, the proportional counter 55 illustrated in FIG. 4 may have a cylindrical cathode 56 composed of a suitable absorbing metal in a form sufficiently thin to permit the release of internally converted electrons into the gas-filled interior of the counter. A suitable filling gas is argon plus ten percent methane. As is conventional, the counter 55 is provided with a central wire anode 58 extending axially of cathode 56 and connected to the positive terminal of a suitable voltage source 59. Any convenient readout or recording circuitry may be employed, represented schematically by meter 60 in the anode-cathode circuit. Such a proportional counter then responds to incident gamma rays having a frequency within the range for resonant absorption by the cathode and will thus have uses corresponding to those for the photomultiplier detector of FIG. 3.

The arrangement of source and detector, in accordance with the invention, may be applied to other instruments sensitive to relative displacement, such as pressure transducers, strain gauges, transducers having a response to thermal or acoustic energy, and the like. Furthermore, while the seismometer of FIG. 1 has been shown in the form well-suited to surface applications, a cylindrical geometry can be accommodated within a housing of the type employed in well logging operations wherein slips may be mechanically or hydraulically set against the bore wall to anchor the housing, whereupon underground tremors or seismic energy may be detected, the indicator 32 conveniently being located at the surface and connected with the detecting apparatus via a supporting conductor cable.

The invention is susceptible to various additional modifications suiting it to a variety of applications. Accordingly, it is not limited to the embodments illustrated and described but is of a scope defined in the appended claims.

I claim:

1. Apparatus for measuring time variations of an unknown force, comprising a member composed at least partly of a mass having a relatively high atomic number defining a collimating aperture for gamma rays, a radioactive source providing substantially recoilless emission of gamma rays supported within said mass to emit such gamma rays through said aperture in a beam, detector means including a material capable of substantially recoilless resonant absorption of such gamma rays and an electron multiplier for providing a signal which varies as a function of the rate at which such gamma rays are resonantly absorbed thereby, means supporting said member for relative movement of said source toward and away from said detector means with a displacement proportional to an unknown force applied thereto and with said gamma ray beam projected on said material, and means responsive to said signal for providing a continuous record of time variations in said unknown force.

2. Apparatus as defined in claim 1 wherein said electron multiplier has an evacuated envelope and a photocathode formed on the interior wall thereof comprising said material.

3. Measuring apparatus comprising an evacuated envelope having a window transparent to low energy gamma radiation, an electron multiplier in said envelope including a photocathode supported on the interior of said window and comprising a material capable of substantially recoilless resonant absorption of gamma rays from a predetermined gamma ray source and characterized by ejection of electrons by internal conversion upon resonant absorption of said gamma rays, and means for continuously deriving a time varying signal from said electron multiplier.

4. An accelerometer comprising, a support member, a source of gamma ray energy, means for suppressing the recoil of the atomic nuclei emitting said energy, said source being mounted on said support member, an absorber receiving said gamma ray energy and having atomic nuclei which will exhibit resonance absorption when receiving photons from said source under conditions of zero relative velocity between said source and said absorber, said absorber being resiliently mounted on said support member so that it will be displaced in response to the force of acceleration applied to said support member, and means for detecting photons reradiated from said absorber to sense acceleration.

5. An accelerometer as defined in claim 4 wherein said source comprises a radioisotope and said means for suppressing recoil comprises a crystal lattice.

6. An accelerometer as defined in claim 4 including a collimator comprising a member opaque to gamma energy and having an aperture through which a portion of the radiated energy may pass.

7. In an accelerometer, the combination of: a recoilless source of gamma ray photons, means for collimating said photons into a beam, absorber means composed of the same material as said source and located in the path of said beam and movable with respect to said source and said collimating means in response to the force of acceleration, and radiation detector means responsive to photons reradiated from said absorber means to sense displacement of said absorber means.

8. An accelerometer comprising, a support member, a recoilless source of gamma ray energy, said source being mounted on said support member, an absorber foil receiving said gamma ray energy and having atomic nuclei which will exhibit resonance absorption when receiving photons from said source under conditions of zero relative velocity between said source and said absorber foil, said absorber foil being resiliently mounted on said support member so that it will be relatively displaced in response to the force of acceleration applied to said support member, and a scintillation counter for detecting photons reradiated from said absorber foil to sense acceleration.

9. An accelerometer comprising, a radioisotope for emitting gamma ray photons, collimator means for collimating said photons into a beam, absorber means located in the path of said beam, said absorber means being capable of maximum absorption of said photons under conditions of zero relative velocity between said radioisotope and said absorber means, said absorber means being responsive to changes of said relative velocity so as to decrease the absorption of said photons, resilient means mounting said absorber means so that an applied acceleration will result in a relative displacement between said absorber means and said radioisotope, and detector means responsive to reradiation of said absorber means to sense the applied acceleration.

10. An accelerometer comprising, a source of gamma rays, absorber means having atomic nuclei which are responsive to the gamma rays emitted from said source to exhibit nuclear resonance under conditions of zero relative velocity between said source and said absorber means, detector means responsive to nuclear resonance of said absorber means, said absorber means being resiliently mounted with respect to said source whereby an applied acceleration will result in different relative velocities of said source and said absorber means thereby causing said detector means to sense a change in nuclear resonance.

11. An accelerometer as defined in claim 10 wherein said source and said absorber means are each fabricated from the same radioisotope.

12. An accelerometer as defined in claim 10 wherein said detector means comprises a scintillation counter responsive to changes in reradiation of said absorber means resulting from corresponding changes in nuclear resonance.

References Cited

UNITED STATES PATENTS

| | | | |
|---|---|---|---|
| 2,525,832 | 10/1950 | Sheldon | 250—71.5 |
| 2,745,969 | 5/1956 | Keller | 250—106 |
| 2,769,915 | 11/1956 | Tittle | 250—71.5 |
| 2,821,633 | 1/1958 | Friedman | 250—71.5 |
| 2,835,821 | 5/1958 | Fearon | 250—71.5 |
| 2,913,900 | 11/1960 | Andrews | 250—43.5 |
| 2,947,871 | 8/1960 | Friedman | 250—83.4 |
| 3,024,364 | 3/1962 | Wanetick | 250—83.3 |
| 3,052,797 | 9/1962 | Kronenberg | 250—83.3 |

OTHER REFERENCES

Pound et al.: (1), "Resonant Absorption of the 14 kev. Gamma Ray from Fe 57," published in the Physical Review Letters of Dec. 15, 1959, pp. 554 to 557.

Pound et al.: (2), "Apparent Weight of Photons," published in the Physical Review Letters of April 1, 1960, pp. 337 to 342.

JAMES J. GILL, *Primary Examiner*.

RALPH NILSON, A. R. BORCHELT, RICHARD C. QUEISSER, *Examiners*.

E. STRICKLAND, *Assistant Examiner*.